US011009690B2

United States Patent
Nakasho et al.

(10) Patent No.: US 11,009,690 B2
(45) Date of Patent: May 18, 2021

(54) CELL OBSERVATION APPARATUS AND CELL OBSERVATION METHOD

(71) Applicant: OLYMPUS CORPORATION, Tokyo (JP)

(72) Inventors: Eiji Nakasho, Tokyo (JP); Hiroshi Sasaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/292,487

(22) Filed: Mar. 5, 2019

(65) Prior Publication Data
US 2019/0278070 A1    Sep. 12, 2019

(30) Foreign Application Priority Data

Mar. 12, 2018    (JP) .............................. JP2018-043700

(51) Int. Cl.
| G02B 21/08 | (2006.01) |
| G02B 21/00 | (2006.01) |
| G02B 21/36 | (2006.01) |
| G02B 5/00 | (2006.01) |
| H04N 5/225 | (2006.01) |
| G02B 5/20 | (2006.01) |
| G02B 21/26 | (2006.01) |

(52) U.S. Cl.
CPC ......... *G02B 21/0088* (2013.01); *G02B 5/005* (2013.01); *G02B 5/208* (2013.01); *G02B 21/08* (2013.01); *G02B 21/36* (2013.01); *H04N 5/2253* (2013.01); *H04N 5/2254* (2013.01); *G02B 21/26* (2013.01)

(58) Field of Classification Search
CPC .... G02B 21/0088; G02B 21/08; G02B 21/36; G02B 5/005; G02B 5/208; G02B 21/26; H04N 5/2254; H04N 5/2253
See application file for complete search history.

(56) References Cited

U.S. PATENT DOCUMENTS

| 5,481,393 | A | * | 1/1996 | Kashima | ................ | G02B 27/58 |
| | | | | | | 359/227 |
| 6,061,120 | A | * | 5/2000 | Nakata | ............... | G02B 21/0004 |
| | | | | | | 356/51 |
| 2004/0209255 | A1 | * | 10/2004 | Koster | ................. | C12Q 1/6834 |
| | | | | | | 435/6.14 |
| 2006/0092506 | A1 | | 5/2006 | Tsuchiya et al. | | |
| 2010/0219353 | A1 | * | 9/2010 | Akiyoshi | ........... | G02B 21/0088 |
| | | | | | | 250/459.1 |
| 2016/0343539 | A1 | * | 11/2016 | Hariyama | ............... | H01J 37/20 |
| 2018/0045622 | A1 | * | 2/2018 | Deisseroth | ............ | G06T 7/0014 |
| 2018/0087964 | A1 | * | 3/2018 | Hiraoka | .................. | G01J 3/027 |

FOREIGN PATENT DOCUMENTS

| EP | 1653269 A1 | 5/2006 |
| JP | 2006-126481 A | 5/2006 |
| JP | 2010-271357 A | 12/2010 |

* cited by examiner

*Primary Examiner* — Dave Czekaj
*Assistant Examiner* — Berteau Joisil
(74) *Attorney, Agent, or Firm* — Scully, Scott, Murphy & Presser, P.C.

(57) ABSTRACT

Provided are an apparatus and a method that can acquire a shaded three-dimensional image having a high contrast for a thick cell culture specimen. Provided are an apparatus and a method that observe a biological sample accommodated in a container by a modulation contrast method using a near-infrared wavelength, at least the bottom surface of the container being formed of a plastic raw material.

16 Claims, 5 Drawing Sheets

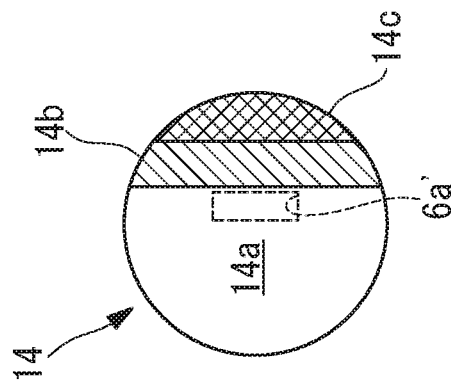
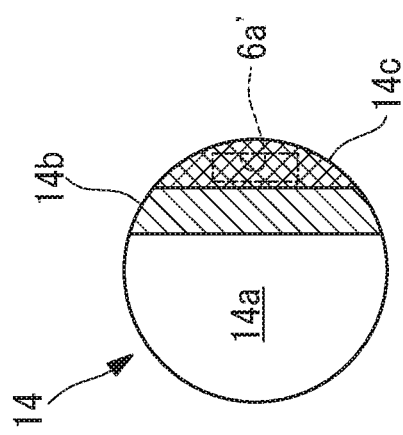
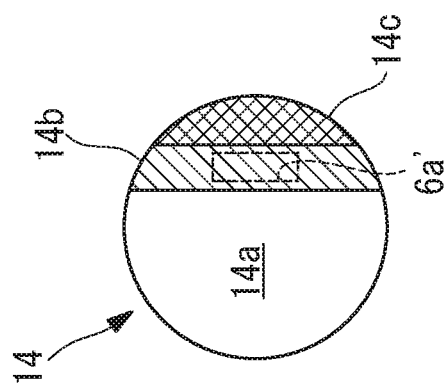

CELL OBSERVATION APPARATUS AND CELL OBSERVATION METHOD

CROSS-REFERENCE TO RELATED APPLICATIONS

This application is based on Japanese Patent Application No. 2018-043700, the contents of which are incorporated herein by reference.

TECHNICAL FIELD

The present invention relates to a cell observation apparatus and a cell observation method.

BACKGROUND ART

In recent years, with progress of stem cell research and regenerative medicine, stereoscopic cells have been prepared for transplantation and other uses. Cells for transplantation are preferably those which are not labeled with fluorescence or the like, and it has been required to observe three-dimensional thick cultured cells (for example, spheroids, cell sheets, etc.) by non-labeling.

CITATION LIST

Patent Literature

{PTL 1}
Japanese Unexamined Patent Application, Publication No. 2006-126481
{PTL 2}
Japanese Unexamined Patent Application, Publication No. 2010-271357

SUMMARY OF INVENTION

An aspect of the present invention provides a method of observing a biological sample accommodated in a container by a modulation contrast method using a near-infrared wavelength, at least a bottom surface of the container being formed of a plastic raw material.

Another aspect of the present invention provides a method of observing a biological sample accommodated in a container, at least a bottom surface of the container being formed of a plastic raw material, the method comprising: irradiating the biological sample with light having a near-infrared wavelength through an aperture plate and a condenser lens, the aperture plate having a rectangular aperture at a position distant from a center portion thereof; and forming an image of light from the biological sample on an image pickup device via the plastic raw material, an objective lens, a modulator, and an imaging lens, wherein the modulator has a region where transmittance changes stepwise.

Another aspect of the present invention provides an inverted microscope comprising: a container configured to accommodate a biological sample, at least a bottom surface of the container being formed of a plastic raw material; a stage on which the container is placed; a near-infrared illuminating unit configured to illuminate the biological sample; an aperture plate having a rectangular aperture at a position distant from a center portion thereof; a condenser lens; an objective lens; a modulator having a region where transmittance changes stepwise; an imaging lens; and an image pickup device, wherein the condenser lens, the aperture plate, and the near-infrared illuminating unit are arranged at positions opposed to the objective lens, the modulator, the imaging lens, and the image pickup device by interposing the container therebetween, and the aperture plate and the modulator are arranged at a pupil position of the objective lens or a position conjugate with the pupil position of the objective lens.

Another aspect of the present invention provides an inverted microscope comprising: a container configured to accommodate a biological sample, at least a bottom surface of the container being formed of a plastic raw material; a stage on which the container is placed; a light source configured to illuminate the biological sample; an aperture plate having a rectangular aperture at a position distant from a center portion thereof; a condenser lens; an objective lens; a modulator having a region where transmittance changes stepwise; an imaging lens; an image pickup device; and a bandpass filter configured to extract a near-infrared wavelength, wherein the condenser lens, the aperture plate, and the light source are arranged at positions opposed to the objective lens, the modulator, the imaging lens, and the image pickup device by interposing the container therebetween, the aperture plate and the modulator are arranged at a pupil position of the objective lens or a position conjugate with the pupil position of the objective lens, and the bandpass filter is arranged at any position in an optical path extending from the light source to the image pickup device.

BRIEF DESCRIPTION OF DRAWINGS

FIG. 4A is an explanatory diagram showing a modulator according to the present invention and the position of a rectangular aperture projected onto the modulator.

FIG. 4B is an explanatory diagram showing a modulator according to the present invention and the position of a rectangular aperture projected onto the modulator.

FIG. 4C is an explanatory diagram showing a modulator according to the present invention and the position of a rectangular aperture projected onto the modulator.

DESCRIPTION OF EMBODIMENT

A cell observation apparatus according to an embodiment of the present invention will be described hereunder with reference to the drawings.

First Embodiment

Figure 1:
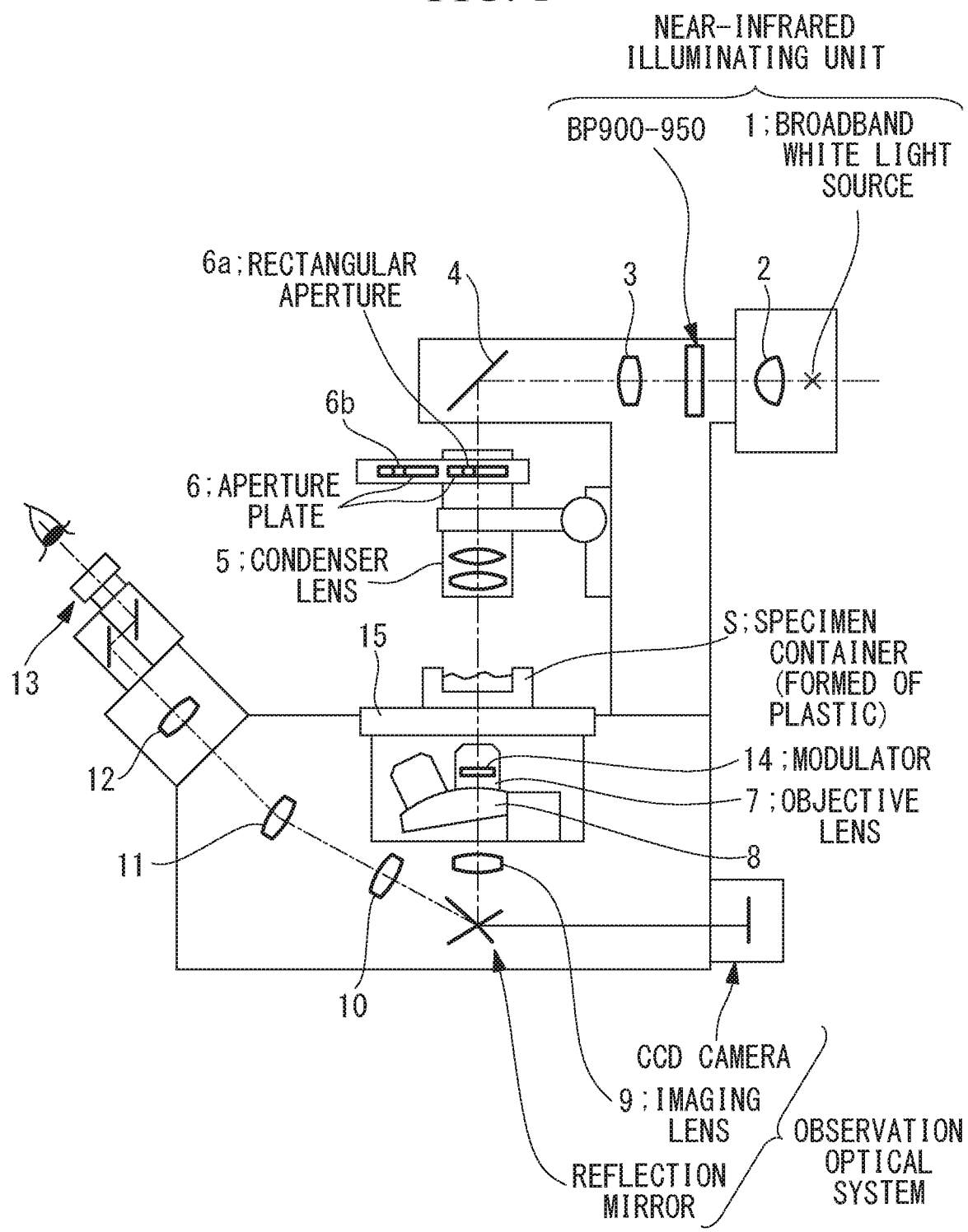
FIG. 1 is an explanatory diagram showing an apparatus according to a first embodiment of the present invention.

A cell observation apparatus 100 according to the present embodiment is an inverted microscope configured as shown in FIG. 1.

A culture medium and cells are accommodated in a container S mounted on a stage 15, at least a bottom surface of the container S being formed of a plastic raw material.

The cell observation apparatus 100 includes an optical system of a modulation contrast method and an observation optical system.

The optical system of the modulation contrast method includes a broadband white light source 1, a bandpass filter (BP900-950) for selecting near-infrared wavelengths (900 to 950 nm), a condenser lens 5, an aperture plate 6, an objective lens 7, and a modulator 14.

A near-infrared illuminating unit is configured of the broadband white light source 1 and the bandpass filter (BP900-950).

The position of the bandpass filter (BP900-950) is not limited to just after the broadband light source 1, and the bandpass filter (BP900-950) may be arranged anywhere insofar as it does not adversely affect optical performance. For example, the bandpass filter (BP900-950) may be arranged on an infinite distance optical path between an imaging lens and the modulator.

Wavelengths of 750 nm or more can be applied as the selected wavelength region of the bandpass filter, and desirably, wavelengths of 900 nm or more are superior because scattering by cells to be observed is little.

Figure 2:
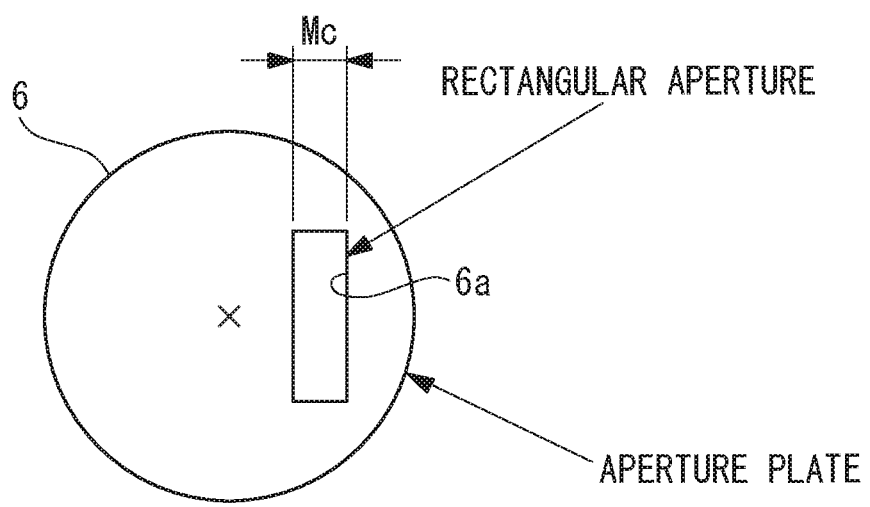
FIG. 2 is an explanatory diagram showing an example of a schematic configuration of an aperture plate of the present invention.

As shown in FIG. 2, the aperture plate 6 has a rectangular aperture 6a.

The modulator 14 has a region where the transmittance changes stepwise. For example, as shown in FIGS. 3A to 4C, the modulator 14 has a region 14a having transmittance of 100%, a region 14b having transmittance of 15%, and a region 14c having transmittance of 0%.

The aperture plate and the modulator are arranged at a pupil position of the objective lens or a position conjugate with the pupil position of the objective lens.

The observation optical system includes an imaging lens 9, a reflecting mirror, and an image pickup device (such as a CCD camera).

The image pickup device used is one having high sensitivity in the near-infrared wavelength range (about 700 to 1000 nm).

In FIG. 1, reference numeral 5 represents the condenser lens, reference character S represents a specimen container (at least the bottom surface of which is formed of a plastic raw material), and cultured cells (not shown) are accommodated in the specimen container. Reference numeral 7 represents the objective lens. Reference numeral 6 represents the aperture plate, which has a rectangular aperture 6a at a position distant from a center portion as shown in FIG. 2. Reference numeral 14 represents a disk-shaped modulator and is arranged at a position which is substantially conjugate with the aperture plate 6. As shown in FIGS. 3A to 4C, the region 14a having transmittance of 100%, for example, the region 14b having transmittance of 15% and the region 14c having transmittance of 0% which may include an image of the aperture 6a are sequentially arranged in the modulator 14 so as to be adjacent to one another.

Figure 3A:
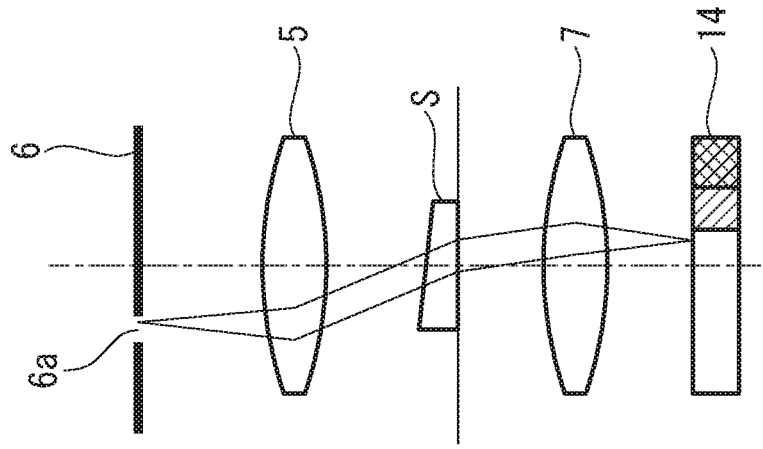
FIG. 3A is an explanatory diagram showing an optical path diagram of a modulation contrast method of the present invention.
Figure 3B:
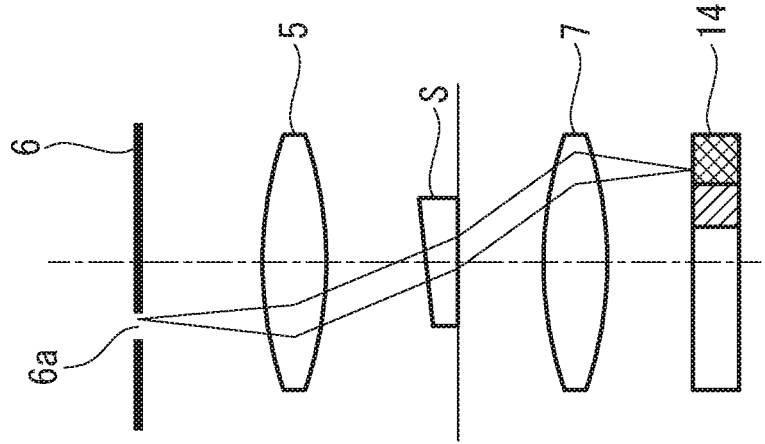
FIG. 3B is an explanatory diagram showing an optical path diagram of a modulation contrast method of the present invention.
Figure 3C:
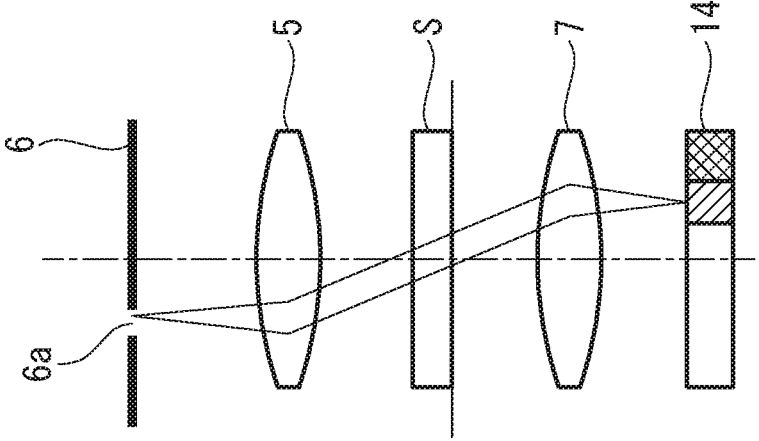
FIG. 3C is an explanatory diagram showing an optical path diagram of a modulation contrast method of the present invention.
Figure 5A:
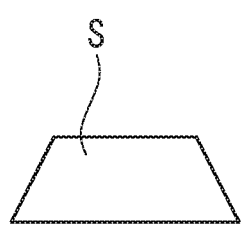
FIG. 5A is an example of a shape of a specimen.
Figure 5B:
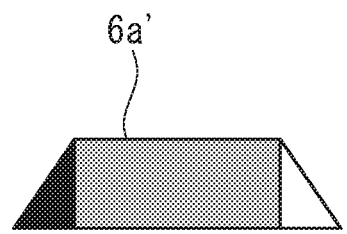
FIG. 5B is an explanatory diagram showing shading appearing in correspondence to this specimen.

In this optical system, since the rectangular aperture 6a is arranged at a position eccentric from the optical axis, light incident to the condenser lens 5 is emitted so as to illuminate a specimen S' from an oblique direction. At this time, in the case where the transparent specimen S' is flat as shown in FIG. 3A, a light flux transmitted through the specimen S' forms an image in the region 14b of the modulator 14 by the objective lens 7, so that an aperture image 6a' is formed in the region 14b as shown in FIG. 4A. In the case where the surface of the specimen S' is a slope rising to the right as shown in FIG. 3B, the light flux is refracted to the right to form an image in the region 14c of the modulator 14 when passing through the specimen S', so that the aperture image 6a' is formed in the region 14c as shown in FIG. 4B. In the case where the surface of the specimen S' is a slope rising to the left as shown in FIG. 3C, the light flux is refracted to the left when passing through the specimen S', and forms an image in the region 14a of the modulator 14, so that the aperture image 6a' is formed in the region 14a as shown in FIG. 4C. As is apparent from the foregoing description, when the specimen S' is a colorless transparent body having a flat surface and a slope as shown in FIG. 5A, in an observation image of the specimen S', a flat surface portion looks gray, and a slope portion looks black or white as shown in FIG. 5B. As described above, in the modulation contrast method, even a colorless transparent specimen (unstained specimen, non-labelled specimen) can be also observed as an image having a shadow and a stereoscopic effect by the regions having different transmittances provided to the modulator 14 and an effect of focal illumination.

According to the apparatus of the present embodiment, unlike the differential interference contrast observation, a plastic specimen container suitable for cell culture can be used because of the modulation contrast method (Hoffman modulation contrast method).

Unlike the phase difference observation, it is possible to acquire a shaded stereoscopic image because of the Hoffmann modulation contrast method.

Since the wavelength of the light source is set to near-infrared (750 nm or more, desirably 900 nm or more), it is possible to observe even thick cultured cells with good contrast without scattering.

In the present embodiment, the following modification is conceivable.

The near-infrared illuminating unit including the bandpass filter and the broadband white light source 1 may be replaced with a near-infrared LED light source (for example, LED945).

REFERENCE SIGNS LIST

1 Broadband white light source
2 Collector lens
3 Illumination lens
4 Mirrors
5 Condenser lens
6 Aperture plate
7 Objective lens
8 Revolver
9 Imaging lens
10, 11, 12 Relay lens
13 Eyepiece
14 Modulator
15 Stages
S Container
S' Specimen

The invention claimed is:

1. A method of optically observing a biological sample accommodated in a container, at least a bottom surface of the container being formed of a plastic raw material, the method comprising:

irradiating the biological sample with light having a near-infrared wavelength through an aperture plate and a condenser lens, the aperture plate having a rectangular aperture, wherein the rectangular aperture is arranged at a position distant from both a center portion thereof and an optical axis; and forming an image of light from the biological sample on an image pickup device via the plastic raw material, an objective lens, a modulator, and an imaging lens, wherein the modulator is arranged at a pupil position of the objective lens or a position conjugate with the pupil position of the objective lens, and wherein the modulator has a region where transmittance changes stepwise.

2. The method according to claim 1, wherein the near-infrared wavelength is 900 nm or more.

3. The method according to claim 1, wherein the biological sample is a cell aggregate having an unstained three-dimensional structure.

4. An inverted microscope comprising:
- a container configured to accommodate a biological sample, at least a bottom surface of the container being formed of a plastic raw material;
- a stage on which the container is placed;
- a near-infrared illuminating unit configured to illuminate the biological sample;
- an aperture plate having a rectangular aperture, wherein the rectangular aperture is arranged at a position distant from both a center portion thereof and an optical axis; and
- a condenser lens;
- an objective lens;
- a modulator having a region where transmittance changes stepwise;
- an imaging lens; and
- an image pickup device, wherein
  the aperture plate and the modulator are arranged at a pupil position of the objective lens or a position conjugate with the pupil position of the objective lens, and wherein
  the aperture plate is arranged on a side of the near-infrared illuminating unit than the biological sample, and
  the modulator is arranged on a side of the image pickup device rather than the biological sample.

5. The inverted microscope according to claim 4, wherein a near-infrared wavelength illuminated by the near-infrared illuminating unit is 900 nm or more.

6. The inverted microscope according to claim 4, wherein the biological sample is a cell aggregate having an unstained three-dimensional structure.

7. The inverted microscope comprising according to claim 4, wherein
the near-infrared illuminating unit comprises:
- a light source and
- a bandpass filter configured to extract a near-infrared wavelength from light illuminated by the light source.

8. The method according to claim 1, wherein the aperture plate is arranged at a position conjugate with the pupil position of the objective lens.

9. The method according to claim 1, wherein the modulator comprises a first region of a first transmittance, and a second region of a second transmittance that is different from the first transmittance, wherein the second region is offset from the first region in a direction parallel to a short side of the rectangular aperture of the aperture plate.

10. The method according to claim 9, wherein the modulator further comprises a third region of a third transmittance, the third transmittance different from both the first transmittance and the second transmittance, the third region is offset from both the first region and the second region in the direction parallel to the short side of the rectangular aperture of the aperture place.

11. The method according to claim 9, wherein the modulator is disk-shaped.

12. The method according to claim 11, wherein the first region extends around a majority of a circumference of the disk-shaped modulator.

13. The inverted microscope according to claim 4, wherein the modulator comprises a first region of a first transmittance, and a second region of a second transmittance that is different from the first transmittance, wherein the second region is offset from the first region in a direction parallel to a short side of the rectangular aperture of the aperture plate.

14. The inverted microscope according to claim 13, wherein the modulator further comprises a third region of a third transmittance, the third transmittance different from both the first transmittance and the second transmittance, the third region is offset from both the first region and the second region in the direction parallel to the short side of the rectangular aperture of the aperture place.

15. The inverted microscope according to claim 13, wherein the modulator is disk-shaped.

16. The inverted microscope according to claim 15, wherein the first region extends around a majority of a circumference of the disk-shaped modulator.

* * * * *